United States Patent [19]

Lauer

[11] Patent Number: 5,476,313
[45] Date of Patent: Dec. 19, 1995

[54] ELECTROMAGNETIC VALVE, IN PARTICULAR FOR HYDRAULIC BRAKE SYSTEMS WITH SLIP CONTROL

[75] Inventor: Josef Lauer, Nonnweiler, Germany

[73] Assignee: ITT Automotive Europe GmbH, Germany

[21] Appl. No.: 290,729

[22] PCT Filed: Jan. 23, 1993

[86] PCT No.: PCT/EP93/00152

§ 371 Date: Aug. 15, 1994

§ 102(e) Date: Aug. 15, 1994

[87] PCT Pub. No.: WO93/15941

PCT Pub. Date: Aug. 19, 1993

[30] Foreign Application Priority Data

Feb. 14, 1992 [DE] Germany .................... 42 04 417.0

[51] Int. Cl.⁶ .................................................... B60T 8/36
[52] U.S. Cl. ................... 303/119.2; 251/129.15
[58] Field of Search .................... 303/119.2; 137/522, 137/523; 251/729.15

[56] References Cited

U.S. PATENT DOCUMENTS 4,666,125  5/1987  Marts et al. .................. 251/129.15
4,898,434  2/1990  Kohno et al. ................... 303/119.2
4,929,038  5/1990  Reinartz et al. ................ 303/119.2
5,000,420  3/1991  Hendrixon .................... 251/129.15
5,167,442  12/1992 Alaze et al. ................... 303/119.2

FOREIGN PATENT DOCUMENTS 0355055  2/1990  European Pat. Off. ..
0492109  7/1992  European Pat. Off. ..
4028447  12/1992 Germany .

*Primary Examiner*—Matthew C. Graham
*Attorney, Agent, or Firm*—Dykema Gossett

[57] ABSTRACT

The invention is related to an electromagnetic valve including a magnet armature enclosed by a valve dome. The armature performs a stroke movement depending on a magnet coil being energized by the supply of electric current to magnetize a magnet core. A valve needle is slidably disposed in the magnetic armature and is partly encircled by the magnet core. The valve needle interacts with a valve seat which is fixed within a valve housing. A non-ferro magnetic anti-stick disc is disposed between the magnet core and the magnet armature.

3 Claims, 1 Drawing Sheet

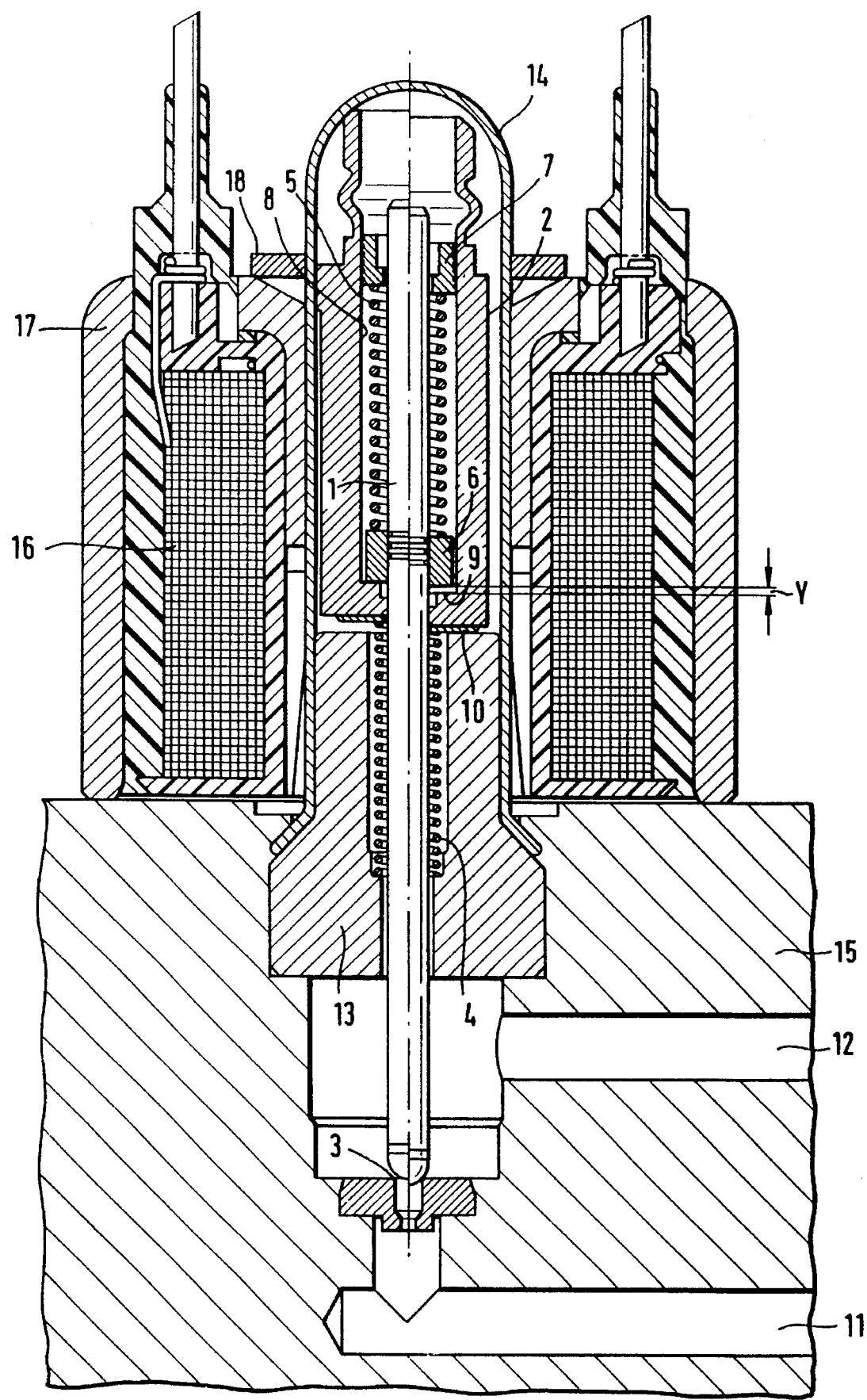

ELECTROMAGNETIC VALVE, IN PARTICULAR FOR HYDRAULIC BRAKE SYSTEMS WITH SLIP CONTROL

TECHNICAL FIELD

The invention relates to electromagnetic valves and more particularly relates to electromagnetic valves for use in hydraulic brake systems with slip control.

BACKGROUND OF THE INVENTION

In the electromagnetic valve described in patent application No. P 40 28 447.6, it has become evident that the pressure relief valve function can be impaired if exact tolerances are not maintained in the valve needle guide of the magnet armature, due to the large frictional forces developed along the long valve needle guide of the magnet armature. As a further disadvantage, looseness may develop distance between the valve closing member and the valve seat due to inaccuracies or to wear.

It is, therefore, the object of the present invention to develop further an electromagnetic valve that avoids the above-mentioned disadvantages. Such a valve includes a precise, easily adjustable valve needle guide featuring minimum friction which guarantees a dependable closure of the valve needle.

SUMMARY OF THE INVENTION

According to one aspect, the valve of the present invention includes a stepped bore that extends over nearly the entire length of the magnet armature and in which configuration an end range within the magnet armature encircling the valve needle in an almost disc-shaped manner guides the valve needle. In the closing position of the valve the first stop being lifted off from the shoulder of the step of the bore by a defined axial distance, contrasting the effect of the compression spring.

The invention is, thus, based on the concept of creating a valve guide having as little friction as possible in the magnet armature and to apply adjustable bearing bushings which are introduced into the magnet armature separately.

BRIEF DESCRIPTION OF THE DRAWINGS

FIG. 1 shows the cross section of an electromagnetic valve in the unactuated (lefthand view of the valve) and in the actuated switching position of the valve (righthand view of the valve).

DETAILED DESCRIPTION OF THE PREFERRED EMBODIMENTS

Now referring to FIG. 1, magnet core 13 is retained within the valve housing 15 by caulking with the relatively thin-wall, drawn valve dome 14. The magnet coil 16 which is slid over the valve dome 14 being fastened by means of a locking ring 18 which is abutted against the coil housing 17 and against the valve dome 14.

In the lefthand illustration in FIG. 1 the valve needle 1 which is guided in the stepped bore 8 of the magnet armature 2 is in the non-energized normal position in which the valve permits of a free passage of the hydraulic pressure agent, so that through the annular slot between the valve seat 3 and the valve needle 1 an opening exists between the first and the second hydraulic pressure agent ducts 11, 12. Ducts 11, 12 are preferably in communication with a slip-controlled wheel brake.

Return spring 4 which is clamped in between the magnet core 13 and the magnet armature 2 lifts the valve needle 1 from the valve seat 3 when the valve coil 16 is in the electromagnetically non-energized normal position. A second compression spring 5 which is positioned in the coaxial stepped bore 8 of the magnet armature 2 and which takes support at a (second) stop 7 being fixed within the magnet armature by a pressing operation maintains the valve needle in the normal position shown in the illustration on the left as seen from the center line of the valve. Furthermore, between the front face of the magnet armature 2 and that of the magnet core 13 a non-ferromagnetic disc 10 is disposed which prevents the undesirable and generally known "sticking" of the magnet armature 2 to the magnet core 13.

As arranged to the right of the centre line of the valve, FIG. 1 moreover shows the movable valve components in the electromagnetically energized position, which will now be described.

MODE OF FUNCTIONING

As a result of the actuating force caused by the magnet coil 16 being energized by the supply of electric current, the valve needle 1 will close the valve seat 3. The valve is designed such that when needle 1 is seated against seat 3, first stop 6 is spaced from bore step 9, (see Y) in FIG. 1 thus the compression spring 5 is compressed. The hydraulic seal between the first and the second hydraulic pressure agent ducts 11, 12 will, as a result of this, is guaranteed on account of the spare stroke Y still remaining between said first stop 6 and said bore step 9, independently of whether or not the actual valve closing stroke changes due to manufacturing inaccuracies or, for example, due to the wear of the valve seat.

As soon as the pressure acting in the first hydraulic pressure agent duct 11 on the valve needle 1 exceeds the prestressing force of the compression spring 5 which has been preadjusted in the magnet armature 2 by means of an adjusting tool, the valve needle 1 will move. The extent of the movement depends on the rigidity of said compression spring 5, the frictional force of the bearing, and the annular-slot throttling becoming effective due to the play of guiding of the valve needle 1 in the two stops 6, 7.

It is customary in hydraulic brake systems with traction slip control of the vehicle wheels which are driven by an engine and are, thus, subject to the risk of traction slip to use valves, such as that of the present invention in the following manner. A system pressure which is inadmissibly high in the first hydraulic pressure agent duct 11 opens the valve needle 1 (although the electromagnetic valve in the function of a traction slip control valve can be activated electrically to interrupt the pressure agent connection toward the second hydraulic pressure agent duct 12 and, thus, also in the direction of the master cylinder which is not shown in the drawing). The excessive brake pressure existing in the first hydraulic pressure agent duct 11 will, thus, be conveyed without obstacle through the opened valve seat 3 in the direction of the second hydraulic pressure agent duct 12. In this way an electromagnetic valve includes a pressure relief valve function which is optimized as to its component parts.

The valve is comparatively simple in construction and because of the sliding and pressing operation of the first stop 6 on the valve needle 1, it affords a precise adjustment of a spare stroke required for the safe closure of the valve needle 1 and which thanks to the slidability and to the subsequent pressing operation of the second stop 7 within the stepped bore 8 of the magnet armature 2 balances the inaccuracy of the prestressing force of the compression spring 5. Due to the relatively large bearing distance of the first stop 6 in respect of the bore step 9 which is disposed at the other end of the magnet armature 2, the valve needle 1 is safely guided and centered within the magnet armature 2 over as large as possible a section in length. In this configuration, the first stop 6 which is fixed to the valve needle 1, for example, by means of a mortise is positioned within the stepped bore 8 with a relatively abundant radial play.

I claim:

1. An electromagnetic valve, comprising:

a housing including a valve seat, a magnetic coil disposed within said housing, a magnet core disposed within said magnetic coil and including a stepped bore, a magnet armature disposed adjacent the magnetic core within said magnetic coil and including a stepped bore, a non-ferro magnetic anti-stick disc with an aperture therethrough and disposed between the magnet armature and the magnet core, a magnet armature spring functionally disposed between the magnet core and the magnet armature, wherein said magnet armature performs a stroke movement toward the core, overcoming the spring, in response to an electric current directed through said magnetic coil, a valve needle having a first spring stop and slidably disposed within said stepped bores of said magnetic armature and said core, and a valve spring disposed between the first spring stop of the valve needle and a second spring stop of the armature biasing the valve needle toward the seat, wherein said stepped bore extends over nearly the entire length of said magnet armature and in an end range of said magnet armature encircles said valve needle and guides said valve needle, and further wherein when the first spring stop seats against a valve stop of the armature then the armature spaced from the core by an amount greater than a thickness of the disc and when the armature is disposed against the disc and the valve needle is fully seated in said valve seat then the first spring stop is spaced from the valve stop.

2. An electromagnetic valve as claimed in claim 1, wherein said second spring stop includes a bore therethrough for closely surrounding and guiding said valve needle.

3. An electromagnetic valve as claimed in claim 2, wherein the stepped bore through said magnet armature includes a portion closely surrounding and guiding said valve needle.

\* \* \* \* \*